W. T. Street.
Life Preserver.
Nº 84,592. Patented Dec. 1, 1868.
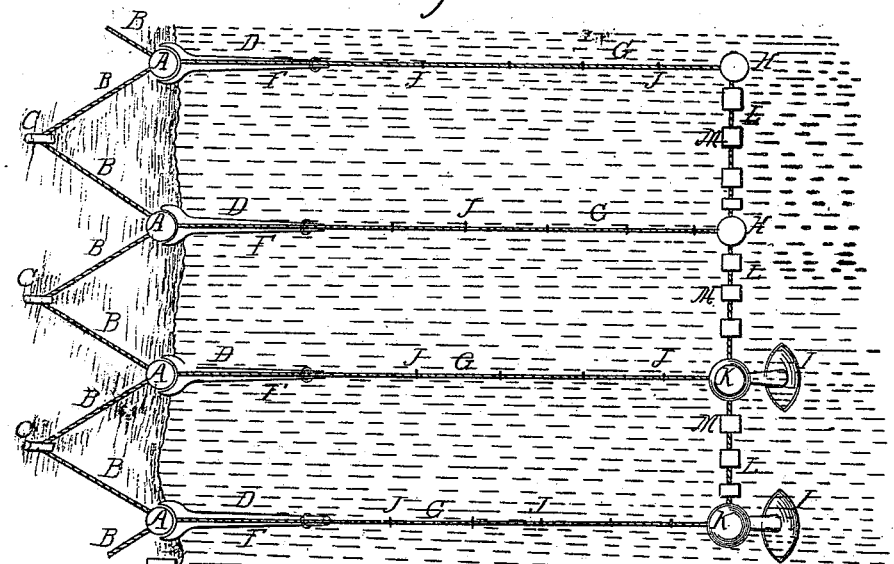
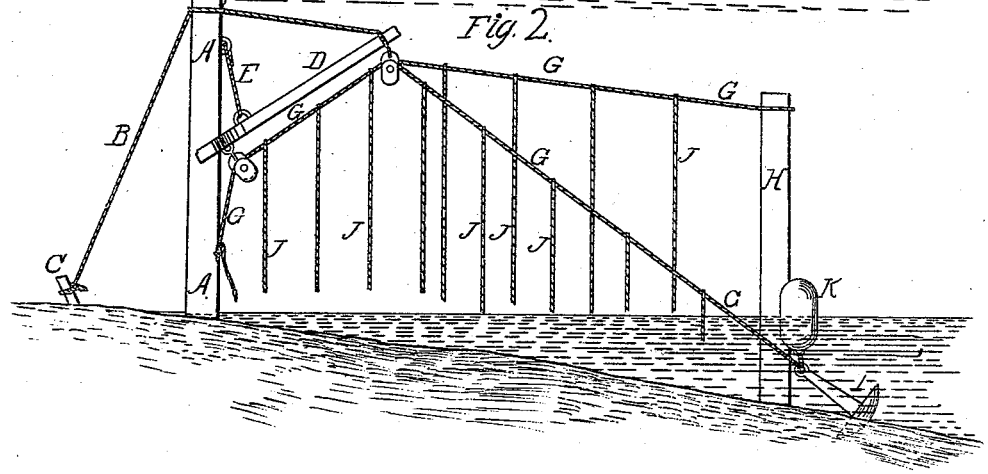
Witnesses:
A. W. Almquist
Wm A Mayan
Inventor:
W T Street
per Munn & Co
Attorneys

WILLIAM TELL STREET, OF FRANKFORD, PENNSYLVANIA.

Letters Patent No. 84,592, dated December 1, 1868.

IMPROVEMENT IN LIFE-LINES FOR SEA-BATHING.

The Schedule referred to in these Letters Patent and making part of the same.

*To all whom it may concern:*

Be it known that I, WILLIAM TELL STREET, of Frankford, Philadelphia, in the county of Philadelphia, and State of Pennsylvania, have invented a new and useful Improvement in Life-Lines for Sea-Bathing; and I do hereby declare that the following is a full, clear, and exact description thereof, which will enable others skilled in the art to make and use the same, reference being had to the accompanying drawings, forming part of this specification, in which—

Figure 1 is a top view of a bathing-place, provided with my improved life-lines.

Figure 2 is a side view of the same.

Similar letters of reference indicate like parts.

My invention has for its object to furnish an improved device for the protection of life at sea-bathing places, and also for the support and amusement of the bathers; and It consists in the combination and arrangement of the various parts of the device, as hereinafter more fully described.

In the following description, the dimensions given are to be taken as suggested dimensions, the absolute dimensions depending upon the particular character of the bathing-place where they are to be used.

A are masts, twenty-five feet high, which are securely set in the ground, at or about high-water mark, and which should be about forty feet apart.

To the upper ends of the masts A are attached the upper ends of the guy-ropes B, the lower ends of which are attached to piles or stakes C, set in the ground, about twenty feet in the rear of the masts A, and half way between said masts, as shown in fig. 1.

D are gaffs, the forked ends of which rest upon the masts A, and are supported in the desired position by the ropes E, the upper ends of which are attached to the upper parts of the masts A, and the lower ends of which are attached to the said forked ends of the said gaffs D.

The gaffs D should be about thirty feet long, and their outer ends are supported by the ropes F, one end of which is attached to the said outer ends of the said gaffs D, and their other ends to the upper ends of the masts A, as shown in fig. 2.

G are the main-stays, which should be about two hundred feet long, and about three inches in diameter.

The outer ends of the stays G should be attached to piles H or anchors I, outside of the breakers.

The rope G passes through two blocks, one at each end of the gaff D, and its other end is attached to the lower part of the masts A.

J are life-lines, made of about half-inch rope, and the upper ends of which are attached to the stays G, at the distance apart of about ten feet. The life-lines J should be of such a length that their lower ends may extend about two feet beneath the surface of the water.

When the outer ends of the stays G are attached to the anchors I, said anchors should have buoys K connected with them, as shown in figs. 1 and 2. The buoys K should be about four feet in diameter and six feet long, and their tail-ends should be connected with the stays G by a rope, (not shown in the drawings,) to guard against the possibility of the said buoys tripping the said anchors.

The piles H and buoys K, whichever are used, should be connected by a rope, L, having cork floats M, about one foot in diameter and two feet apart, placed upon it, forming a cordon around the whole extent of the bathing-place, as shown in fig. 1.

Having thus described my invention,

I claim as new, and desire to secure by Letters Patent—

The combination of the masts A, gaffs D, stays G, life-lines J, piles H, and anchors and buoys I K, either or both, and cork lines L M, with each other, substantially as herein shown and described, and for the purpose set forth.

WM. TELL STREET.

Witnesses:
WM. W. AXE,
WM. B. HILT.